Nov. 22, 1960 O. W. BANIK ET AL 2,961,584

MAGNETIC CORE PACKAGE

Filed June 8, 1956 2 Sheets-Sheet 1

INVENTORS.
OSCAR W. BANIK
JOHN R. CARPENTER
HEBERT J. HAMPEL

BY [signature]
AGENT

Nov. 22, 1960 O. W. BANIK ET AL 2,961,584

MAGNETIC CORE PACKAGE

Filed June 8, 1956 2 Sheets-Sheet 2

INVENTORS.
OSCAR W. BANIK
JOHN R. CARPENTER
HERBERT J. HAMPEL

BY

AGENT

United States Patent Office 2,961,584

Patented Nov. 22, 1960

2,961,584

MAGNETIC CORE PACKAGE

Oscar W. Banik, Paoli, John R. Carpenter, Malvern, and Herbert J. Hampel, Philadelphia, Pa., assignors to Burroughs Corporation, Detroit, Mich., a Michigan corporation Filed June 8, 1956, Ser. No. 590,287

10 Claims. (Cl. 317—101)

The present invention relates to magnetic core packages and more particularly to novel magnetic core unit assemblies associated therewith to form a complete package.

An important object of the invention is to provide a unique magnetic core package accommodating a plurality of individual magnetic unit assemblies.

Another object of the invention is to provide such a package wherein individual unit assemblies may be associated therewith quickly and easily by a plug-in connection.

Still another object of the invention is to provide a novel magnetic unit assembly as a complete, self-contained unit.

It is also an object to provide such an assembly wherein its coils are wound and terminated within its own structure.

A further object of the invention is to provide a magnetic core unit assembly facilitating electrical testing thereof before assembly into the package.

A still further object is to provide a unitary magnetic core assembly capable of being handled as an individual and complete component.

Another object of the invention is to provide a novel printed circuit panel in association with a magnetic core as a unit.

A more specific object is to provide printed circuit panel mounting a magnetic core wherein the core can be wound while mounted and the interconnection of core and circuitry is readily made by dip soldering.

Figure 6:
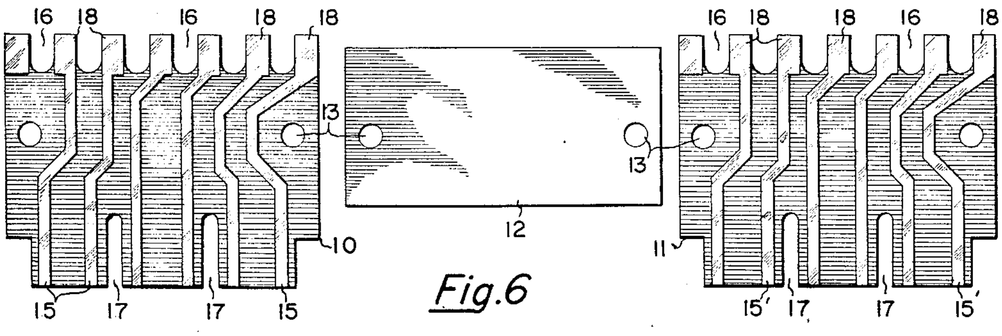
Figure 6 is an exploded elevational view showing parts of a magnetic core unit.
Figure 7:
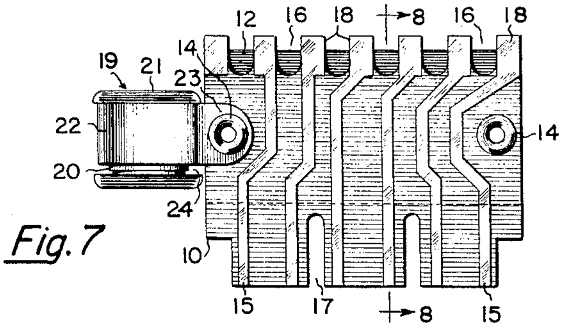
Figure 7 is a side elevational view of an assembled magnetic core unit.
Figure 8:
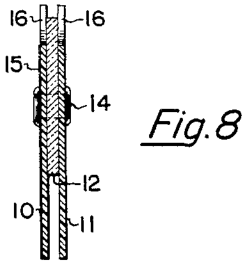
Figure 8 is a section view taken on line 8—8 of Figure 7.
Figure 9:
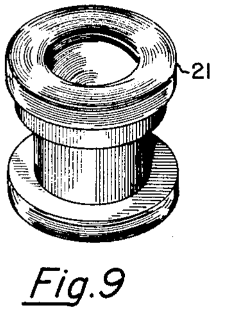
Figure 9 is a perspective view of a core bobbin.
Figure 10:
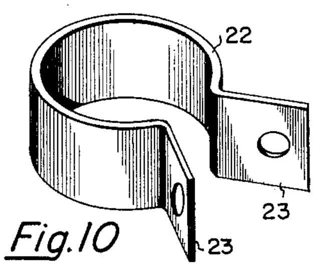
Figure 10 is a perspective view of the core supporting band.
Figure 11:
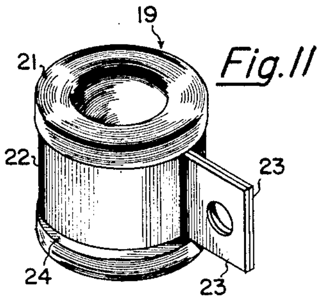
Figure 11 is a perspective view of the completed core assembly.

Referring to the drawings and initially to Figure 6, it will be seen that a magnetic core unit in accordance with the concepts of the present invention comprises a panel including two cards 10 and 11 of insulating non-magnetic material clamped together with a spacer 12 of similar material therebetween, end holes 13 in the three parts being provided to receive clamping eyelets 14 (Figure 8) or other suitable fastening means. The width of spacer 12 is less than the width of each card to permit margins thereof to project beyond the spacer, as will be explained. Each card is formed of phenolic or epoxy glass laminate, the latter being preferred where a dip soldering technic is to be used. In the present embodiment each card is provided with transverse etched copper foil conductors 15 and 15' extending from a castellated margin 16 to the opposite margin where spaced slots 17 are provided.

Figures 5, 12:
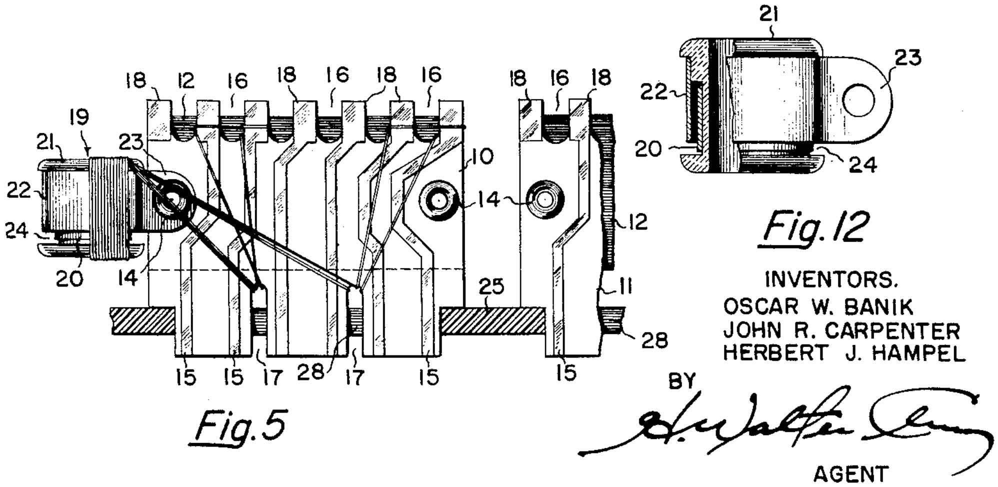
Figure 5 is a sectional view taken on the line 5—5 of Figure 1.
Figure 12 is a side view of a core assembly partly broken away.

The two cards and spacer 12 are assembled as a unit with conductors 15 and 15' facing outwardly, and since the cards are wider than the spacer, they extend both above and below it after being assembled. Preferably the width of the spacer is such as to leave the slots 17 exposed while partially covering the turrets 18 formed by the castellated margin. The castellated tops of the combined card respectively extend just far enough beyond the spacer to provide a clear space behind turrets 18 of either card so that a wire can be looped around any turret and drawn down between that turret and spacer 12, as shown in Figure 5. Thus the turrets cooperate with the spacer to retain the wires in place until they are more positively secured as by soldering. The extension of the cards below the spacer permits flexing of the cards along that margin. The assembled card is used to hold a magnetic core 19 during a wire winding operation thereon, one of the eyelets 14 serving to fasten the core in place, see Figure 5.

As illustrated in Figures 9 through 12, one form of magnetic core comprises a tape 20 of magnetizable material wrapped on the bobbin 21 of suitable material, such as non-magnetic stainless steel, to which the tape ends may be spot welded. The core thus formed is enclosed by a band 22, which may also be of non-magnetic stainless steel, as a protection for tape 20, as well as to provide means for mounting the core on its card by abutting end tabs 23 of the band. An air gap 24 is provided at one end of the core assembly to prevent a closed conducting path from existing around the magnetic tape 20.

In connection with the winding of the core, as seen more clearly in Figure 5, an enameled wire is used from which the terminal insulation is stripped incidental with a dip soldering operation, thus achieving simultaneous stripping and electrical connection thereof with the printed circuitry. It has been found that such wire can be satisfactorily stripped and soldered by immersion for two seconds in solder at 625° F.

With the core assembled thereon, the unit is mounted on a core winding, machine, not shown, and the shuttle of which is loaded with enough wire for the contemplated coil or coils. The start end of a coil is first passed through one of the card slots 17 in the bottom of the card and then looped around one of the turrets 18 and anchored between spacer 12 and the turret, as shown in Figure 5. The coil is then wound onto the core in the usual manner. The final convolution of the coil is passed through one of the slots 17, looped around another turret and snipped off. The purpose of feeding the wires through slots 17 at the bottom of the card is to prevent shorting out coils during the soldering operation by directing the wires approximately perpendicular to the solder surface in the solder pot. In the dip soldering operation just the castellated margin of the unit is immersed in the solder whereby the coil terminals are simultaneously stripped and soldered to the turrets thus to eliminate separate stripping operations.

Figure 1:
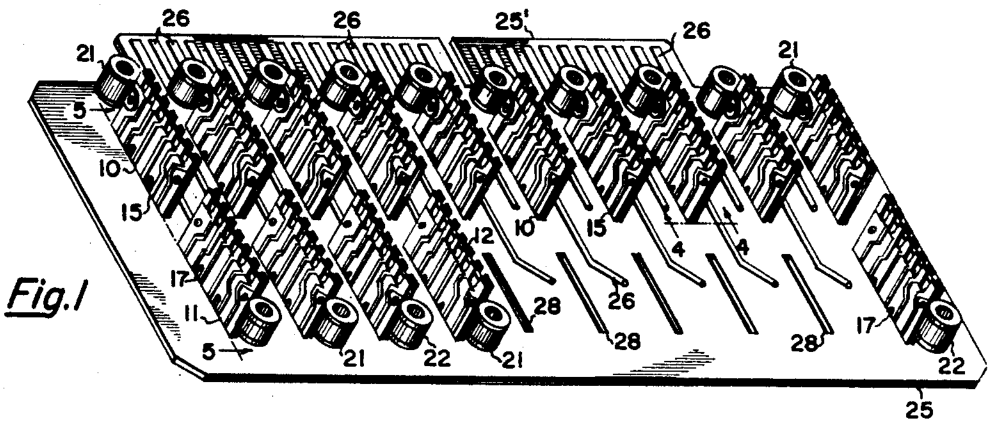
Figure 1 is a perspective view of one side of a magnetic core package in accordance with the concept of the invention, with parts removed for better illustration.
Figure 2:
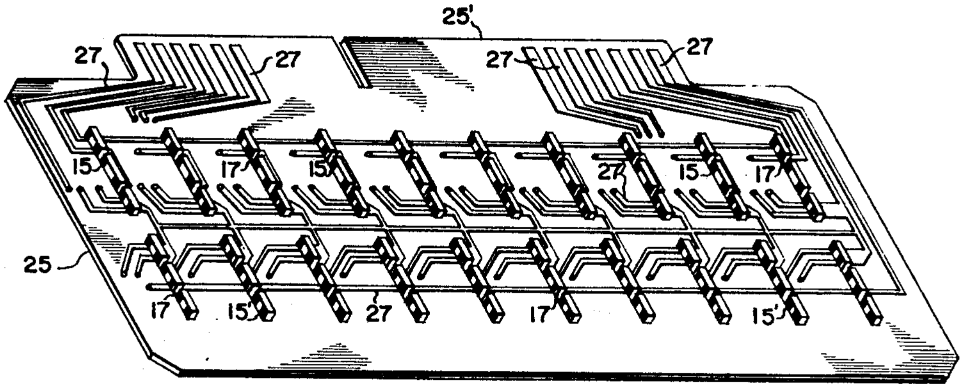
Figure 2 is a perspective view of the opposite sides of the package shown in Figure 1.
Figure 3:
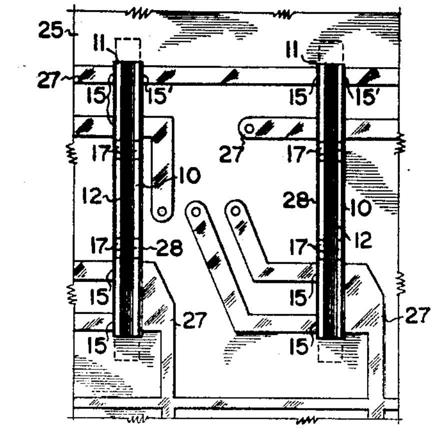
Figure 3 is an enlarged plan view of a portion of the package.

Referring now to Figures 1 and 2, a printed circuit panel or board 25 of insulating non-magnetic material for mounting a plurality of core assemblies is shown arranged as a ten stage utility shift register having two rows of oppositely disposed magnetic unit assemblies, as described above. The upper face of board 25, as shown in Figure 1, is printed or etched with conductors 26 for connection with conductors 27 on the opposite board face (Figure 2) through the medium of the inserted core units. In this instance there are ten pairs of aligned slots 28 through the board for the insertion of core units, which normally stand perpendicular to the board. In this position the conductor terminals on one side of the unit make contact with conductors on the top face of board 25, while the conductor terminals on the other side of the unit make contact with conductors on the bottom face of the board. The terminals on the top and bottom faces of the board are arranged in rows on an elongated side extension 25′ of the board which serves as a plug-in to an associated multiple connector socket.

An advantage of this package system is that a supply of unit assemblies can be made up and stored for future use with circuit prepared boards so that the number required for a particular circuit arrangement is immediately available. Each such unit assembly, having been dip soldered to bond the windings to the turrets, is a complete unit ready for insertion in its proper slot in a prepared board so that its bottom margin protrudes through the board in a manner whereby its conductors are in such close proximity to the board conductors that a final dip soldering operation completes a bonded connection. As the cards are withdrawn the solder between adjacent turrets drops back into the solder pot so there is no danger of shorting circuits.

Figure 4:
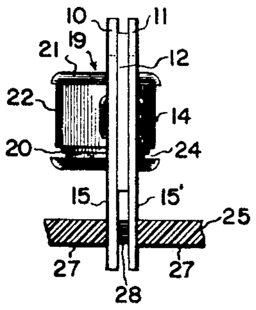
Figure 4 is a sectional view taken on line 4—4 of Figure 1.

Referring to Figure 4 of the drawings it should be noted that the width of the spacer is such as to provide relatively long card bottom margins to enter a card receiving slot 28 which has a width less than the overall width of the two margins and the spacer. Thus the relatively long space between the card margins provides for flexing of the overwidth margins when pushed into the slots thus to ensure a firm mechanical fit without close tolerances in the slot width. Bonding together of the closely adjacent conductors is by the above mentioned dip soldering operation.

It will now be apparent that a novel magnetic core package has been devised including complete self contained unit assemblies, each of which is capable of having its coil wound and terminated within its own structure, and wherein all circuitry is self carried thus to eliminate all need for interconnecting by individual wires. With a unit so assembled it is also possible to electrically test the cores before final assembly into the associated circuits, while at the same time the novel etched construction enables use of the assemblies with a printed circuit terminal board in a manner permitting the interconnection of components, cores and circuitry by dip soldering.

What is claimed is:

1. A magnetic core package comprising a plug-in board of insulating non-magnetic material having printed circuit conductors on opposite faces thereof and slots interrupting certain of said conductors, printed circuit cards of insulating non-magnetic material for insertion in said slots, each card being formed of two cards with a spacer therebetween, said spacer providing juxtaposed card margins having an overall width greater than the slot width for flexing said margins into the slot and biasing its conductors into contact with said board conductors, a magnetic core carried by each card, and windings on said core having terminals bonded to certain of said card conductors.

2. As a new article of manufacture a magnetic unit assembly formed by two cards of insulating non-magnetic material, each card having printed conductors on one side and having one margin formed with slots and another with projections, a spacer of insulating material partially covering said projections, means connecting said cards in back to back relation with said spacer therebetween and the conductor sides exposed, a magnetic core carried by the combined cards, and windings for said core having leads traversing said slots and terminating respectively in bonded relation with certain of said conductor terminals adjacent said projections.

3. A magnetic unit assembly according to claim 2 wherein said bonding relation includes wedging each terminal end of said windings between said spacer and one of said projections.

4. An electrical unit assembly comprising, two cards of insulating non-magnetic material, each card being formed with projections along one of its margins, electrical conductors on one side of each of said cards terminating respectively on said projections, and means securing said cards in spaced apart relation with their conductor sides exposed and with juxtaposed card margins opposite to said first mentioned margins free for flexing toward one another, said means including a spacing element between said cards and partially covering said projections.

5. As a new article of manufacture, an electrical unit assembly comprising, two cards of insulating non-magnetic material, each having a margin provided with spaced projections and another margin provided with slots, each card having printed conductors on one side terminating on said projections and adjacent said slots respectively, means connecting said cards in spaced back to back relation with the conductor sides exposed, said means including a spacing element between said cards and partially covering said projections, an electrical component carried by the combined cards, and leads on said component traversing said slots and having terminals bonded respectively to certain of said conductors and their associated projections.

6. An electrical unit assembly according to claim 5 wherein the spaced relation of said cards is provided by a spacer of insulating material defining said margins.

7. An assembly for a magnetic core unit comprising a pair of cards of insulating non-magnetic material, electrical circuit conductors on opposite sides of said cards and terminating at margins of each card respectively, said margins being provided with slots and projections respectively, a spacer between said cards providing flexibility of said cards at the slotted margins thereof and partially covering said projections at the other of said margins, a magnetic core, means attaching said core to another margin of said cards, and windings on said core having leads traversing said slots and having terminals bonded to certain of said conductors and associated projections.

8. An assembly for a magnetic core unit according to claim 7 characterized further in that said slotted margins and projection margins are respectively adjacent and opposite each other and said means attaching said core to another margin of said cards includes a non-magnetic band.

9. An electrical assembly comprising a plug-in board of insulating nonmagnetic material having printed circuit conductors on a face thereof and a slot interrupting certain of said conductors, a printed circuit panel of insulating non-magnetic material, said panel being formed along one of its margins with a double row of projections and along another of its margins with spaced flexible portions having an overall width greater than the width of said slot for flexing said portions into the slot and biasing said panel conductors into contact with said board conductors, an electrical component carried by said panel, and leads on said component having terminals bonded to certain of said panel conductors and projections.

10. An electrical assembly comprising, a plug-in board of insulating non-magnetic material having electrical circuit conductors on a face thereof, and a slot interrupting certain of said conductors, two cards of insulating non-magnetic material having electrical circuit conductors on opposite sides thereof terminating respectively at adjacent margins of said cards and at opposite margins of each card, said adjacent margins being provided with slots and the opposite margins with projections, a spacer between said cards providing flexiblity of said cards at the slotted margins thereof and partially covering said projections at the other of said margins, an electrical component, means attaching said component to another margin of said cards, and leads on said component traversing said slots and having terminals bonded to certain of said card conductors and associated projections.

References Cited in the file of this patent

UNITED STATES PATENTS

| | | |
|---|---|---|
| 1,718,993 | Wermine | July 2, 1929 |
| 1,938,410 | Billiard | Dec. 5, 1933 |
| 2,226,745 | Schrack | Dec. 31, 1940 |
| 2,474,988 | Sargrove | July 5, 1949 |
| 2,693,584 | Pifer | Nov. 5, 1954 |
| 2,707,272 | Blitz | Apr. 26, 1955 |
| 2,823,360 | Jones | Feb. 11, 1958 |
| 2,823,371 | Jones | Feb. 11, 1958 |
| 2,825,037 | Franch | Feb. 25, 1958 |